(12) United States Patent
Mattice et al.

(10) Patent No.: US 7,621,735 B2
(45) Date of Patent: *Nov. 24, 2009

(54) APPARATUS FOR PLACING MOLD CHARGES INTO A COMPRESSION MOLDING MACHINE

(75) Inventors: Daniel L. Mattice, Columbia City, IN (US); David C. Thompson, Grabill, IN (US); Jerry Schultz, Ft. Wayne, IN (US); Wendell D. Willingham, Perrysburg, OH (US)

(73) Assignee: Rexam Closure Systems Inc., Perrysburg, OH (US)

( * ) Notice: Subject to any disclaimer, the term of this patent is extended or adjusted under 35 U.S.C. 154(b) by 79 days.

This patent is subject to a terminal disclaimer.

(21) Appl. No.: 11/975,318

(22) Filed: Oct. 18, 2007

(65) Prior Publication Data
US 2009/0196948 A1   Aug. 6, 2009

(51) Int. Cl.
*B29C 31/04* (2006.01)
*B29C 43/06* (2006.01)

(52) U.S. Cl. ............... 425/297; 425/305.1; 425/348 R; 425/809

(58) Field of Classification Search ............... 425/297, 425/305.1, 348 R, 350–351, 418, 422, 438, 425/441, 443, 809, DIG. 58
See application file for complete search history.

(56) References Cited

U.S. PATENT DOCUMENTS

| | | |
|---|---|---|
| 1,323,450 A | 12/1919 | Chamberlin |
| 1,647,746 A | 11/1927 | Peiler |
| 2,288,029 A | 6/1942 | Rowe |
| 4,277,431 A | 7/1981 | Peller |
| 4,296,061 A | 10/1981 | Buckingham |
| 5,596,251 A | 1/1997 | Miller |
| 6,696,123 B2 | 2/2004 | Hock et al. |

(Continued)

FOREIGN PATENT DOCUMENTS

WO   WO 2007/045577 A2   4/2007

*Primary Examiner*—Yogendra Gupta
*Assistant Examiner*—Thu Khanh T Nguyen
(74) *Attorney, Agent, or Firm*—Reising Ethington PC

(57) ABSTRACT

An apparatus for placing a mold charge into a mold of a compression molding machine includes a carrier mounted for rotation around a first axis, at least one arm mounted on the carrier for rotation around a second axis at an angle to the first axis, and a mold charge pick-up cup on the arm for receiving a mold charge, transporting the mold charge and placing the mold charge into a mold of the compression molding machine. A cam is carried in stationary position adjacent to the carrier surrounding the first axis, and a cam follower is operatively coupled to the arm in engagement with the cam for rotating the arm and the mold charge pick-up cup around the second axis as the carrier is rotated around the first axis. The second axis of rotation of the arm preferably is perpendicular to the first axis of rotation of the carrier, and the cam and follower preferably are such that the mold charge pick-up cup is oriented horizontally to receive a mold charge and oriented vertically to deposit the mold charge in the mold of the compression molding machine. A control valve preferably is carried for selective application of vacuum and air under pressure through a passage in the arm to the mold charge pick-up cup to assist in pick-up, transport and deposit of the mold charge into the mold.

25 Claims, 10 Drawing Sheets

U.S. PATENT DOCUMENTS

| | | |
|---|---|---|
| 7,247,014 B2 | 7/2007 | Mattice et al. |
| 2005/0241721 A1 | 11/2005 | Ritz et al. |
| 2006/0233904 A1 | 10/2006 | Mattice et al. |
| 2007/0071981 A1 | 3/2007 | Bergami et al. |

APPARATUS FOR PLACING MOLD CHARGES INTO A COMPRESSION MOLDING MACHINE

The present disclosure relates to a machine for compression molding plastic articles, such as closure shells or sealing liners within closure shells, and more particularly to an apparatus for placing mold charges into the molds of the compression molding machine.

BACKGROUND AND SUMMARY OF THE DISCLOSURE

Machines for compression molding closure shells, or compression molding sealing liners within closure shells, typically include a turret or carousel that rotates around a vertical axis. A plurality of molds are provided around the periphery of the carousel, in the form of male and female mold sections that are aligned along vertical axes parallel to the axis of rotation. Cams drive one or both of the mold sections of each pair between an open position, in which a molded part is stripped from the mold and a charge of molten plastic material is placed into the mold, and a closed position in which the mold sections are brought together to compression mold the shell or liner. In a liner machine, premade shells are placed in a nest when the mold sections are open, and a charge or pellet of liner material is placed within the mold before the mold is closed. U.S. patents that illustrate machines of this type for compression molding plastic closure shells include U.S. Pat. Nos. 5,670,110, 5,989,007, 6,074,583 and 6,478,568. U.S. patents that illustrate machines of this type for compression molding sealing liners within closure shells include U.S. Pat. No. 5,451,360.

U.S. patent document 2006/0233904A1 discloses a vertical wheel compression molding machine that rotates around a horizontal axis for compression molding closure shells or sealing liners within closure shells. The apparatus for delivering mold charges to the compression mold cavities includes a carrier plate mounted for rotation around a vertical axis and diametrically spaced mold charge placement mechanisms carried by the plate. Each placement mechanism includes a rotatable shaft having a gear at one end coupled to a gear disposed in (adjustable) fixed position adjacent to the plate. The opposing end of each shaft carries a pick-up cup for receiving a mold charge and transporting the mold charge to a mold cavity on the wheel.

The present disclosure involves a number of aspects that can be implemented separately from or in combination with each other.

An apparatus for placing a mold charge into a mold of a compression molding machine, in accordance with one aspect of the present disclosure, includes a carrier mounted for rotation around a first axis, at least one arm mounted on the carrier for rotation around a second axis at an angle to the first axis, and a mold charge pick-up cup on the arm for receiving a mold charge from a nozzle, transporting the mold charge and placing the mold charge into a mold of the compression molding machine. A cam is carried in stationary position adjacent to the carrier surrounding the first axis, and a cam follower is operatively coupled to the arm in engagement with the cam for rotating the arm and the mold charge pick-up cup around the second axis as the carrier is rotated around the first axis. In exemplary embodiments of the disclosure, the cam follower is directly coupled to the arm, or is coupled to the arm by a rack-and-pinion gear arrangement, or is coupled to the arm by a ball screw and nut system. The second axis of rotation of the arm preferably is perpendicular to the first axis of rotation of the carrier, and the cam and follower preferably are such that the mold charge pick-up cup is oriented horizontally to receive a mold charge and oriented vertically to deposit the mold charge in the mold of the compression molding machine. A control valve preferably is carried for selective application of vacuum and air under pressure through a passage in the arm to the mold charge pick-up cup to assist in transport and deposit of the mold charge into the mold.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

The disclosures of U.S. patent document 2006/0233904A1 and U.S. Pat. No. 7,247,014 are incorporated herein by reference.

Figure 1:
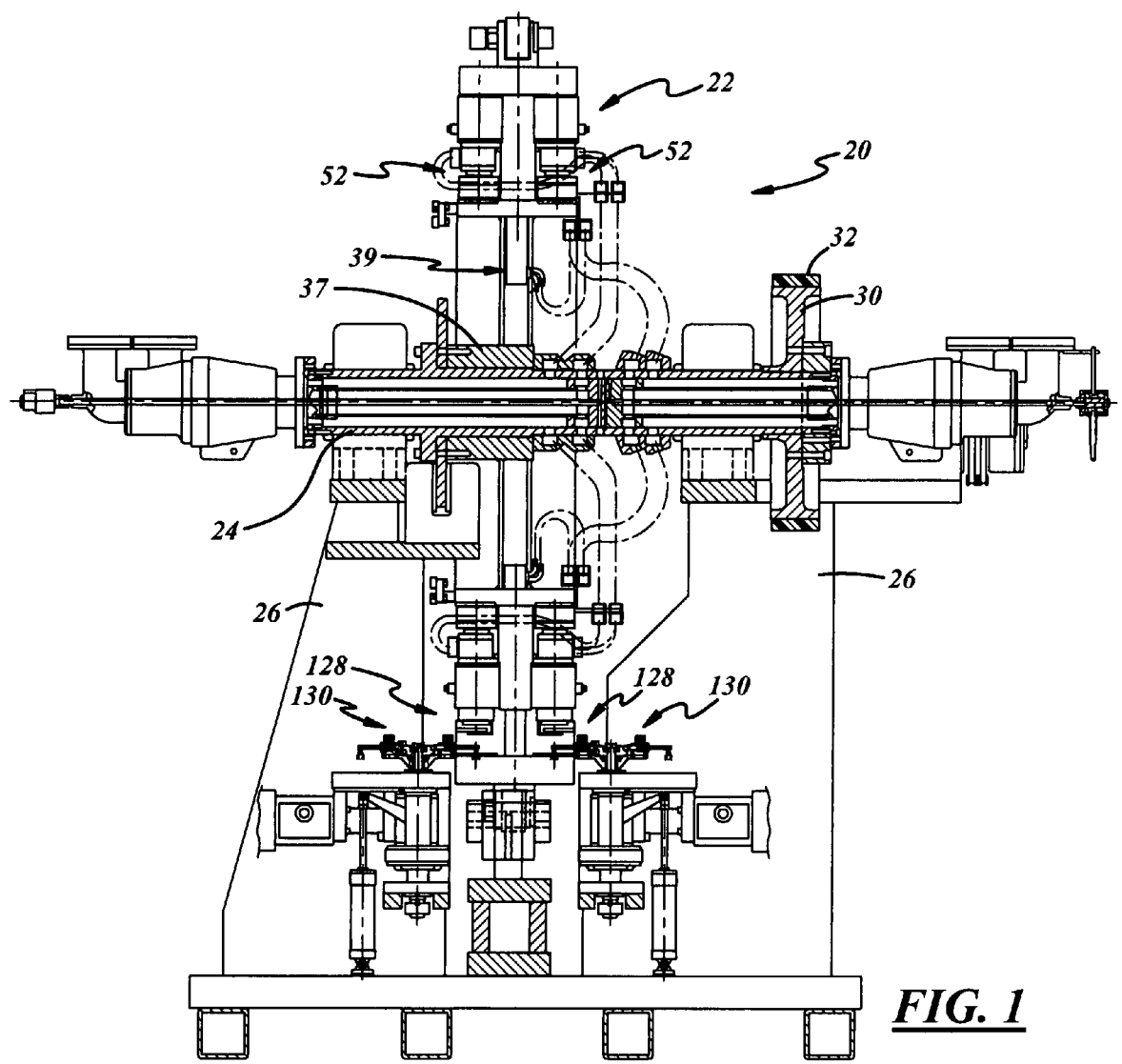
FIG. 1 is a front elevational view of a compression molding machine in accordance with one exemplary implementation of the present disclosure.

FIG. 1 illustrates an exemplary machine 20 for compression molding plastic closure shells. Machine 20 includes a wheel 22 mounted on a shaft 24 between spaced supports 26. Shaft 24 is coupled by a pulley 30 and a belt 32 to a motor for rotating shaft 24 and wheel 22 around a horizontal axis. Wheel 22 includes a hub 37 (which may be part of shaft 24) and a support 39 extending radially from hub 37. Support 39 may comprise a disk or the like, or may be in the form of a plurality of angularly spaced spokes. A plurality of angularly spaced molds 52 are disposed around the periphery of wheel 22, preferably on both sides of the wheel. All of the molds 52 preferably are identical. An apparatus 128 is provided for removing molded parts from the compression molding machine, and an apparatus 130 is provided for placement of mold charges into the molding machine.

Figure 2:
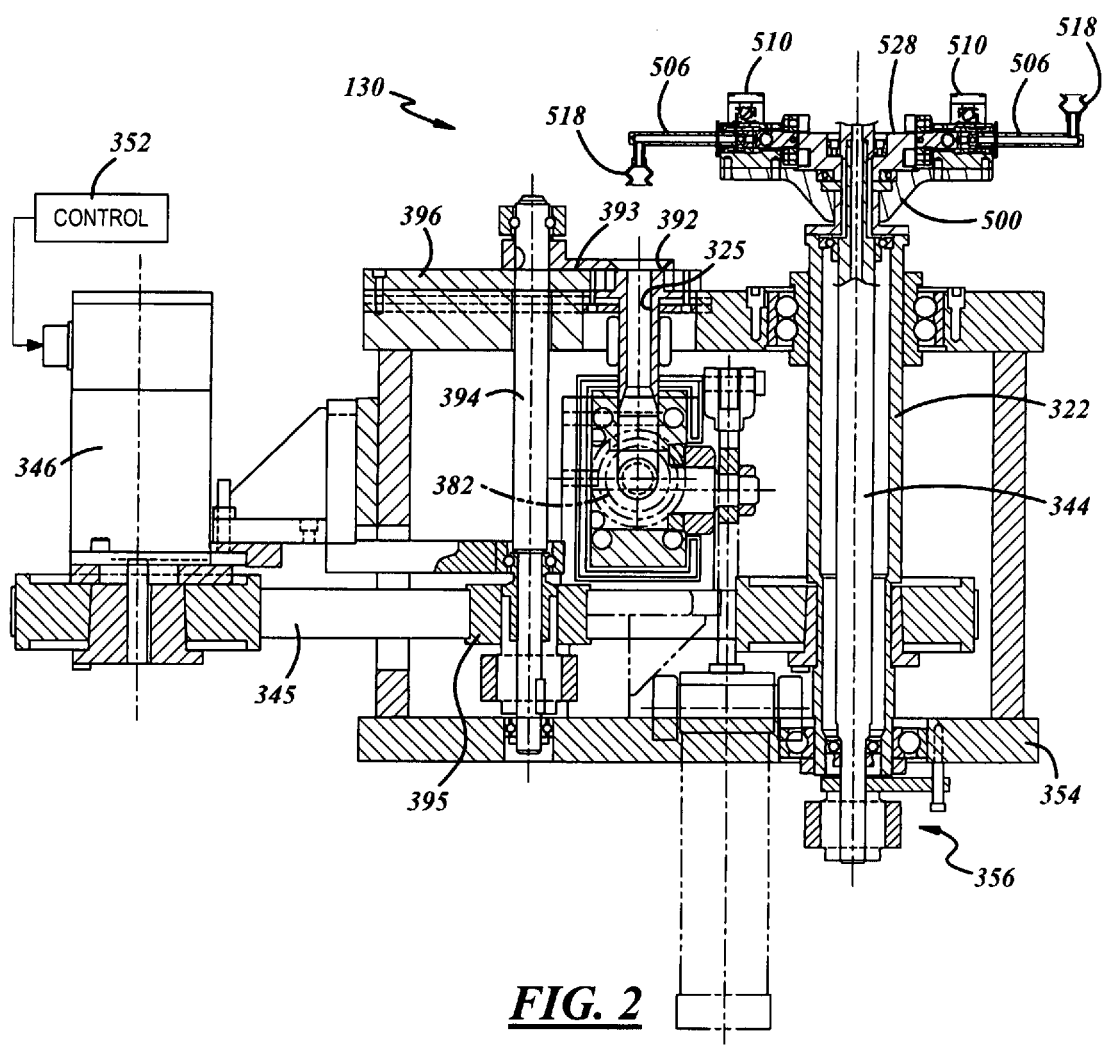
FIG. 2 is a sectional view on an enlarged scale of the mold charge placement apparatus in FIG. 1.

FIG. 2 illustrates a first exemplary mold charge placement apparatus 130. An extruder nozzle 325 is parallel to but laterally offset from the common axis of a sleeve 322 and a shaft 344. A pellet cutter knife 392 is coupled by an arm 393 to a blade shaft 394 for rotation along a plate 396 over the outlet of nozzle 325. The axis of shaft 394 is parallel to but laterally spaced from the axis of sleeve 322 and shaft 344. Sleeve 322 and shaft 394 are coupled by a belt 345 to a motor 346. Shaft 344 preferably is stationary in this embodiment. Shaft 344 preferably is coupled to frame 354 by a phase adjuster 356 for adjusting the "timing" of shaft 344 and cam 528 relative to sleeve 322 and plate 502. Motor 346 is connected to a suitable control 352 for rotating sleeve 322, and rotating drive shaft 394 and blade 392 through a pulley 395, in synchronism with wheel 22 (FIG. 1). Motor 346 may comprise an independently controllable servo motor. As an alternative, sleeve 322 and shaft 394 could be coupled by suitable gears, pulleys or the like to wheel 22 (FIG. 1). Hot melt from an extruder can be fed to nozzle 325 by a diverter valve 382.

Figure 3:
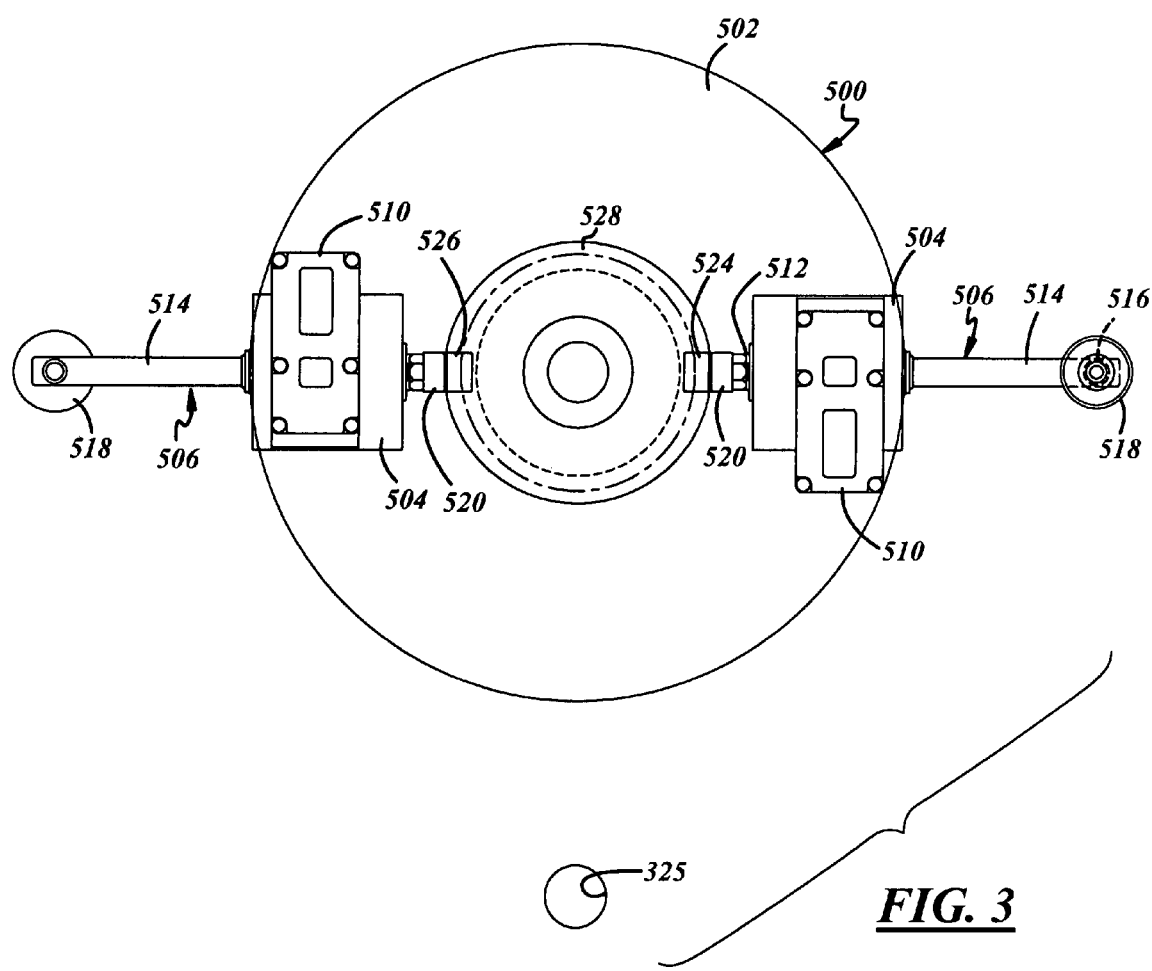
FIG. 3 is a top plan view of the mold charge placement apparatus in FIG. 2.
Figure 4A:
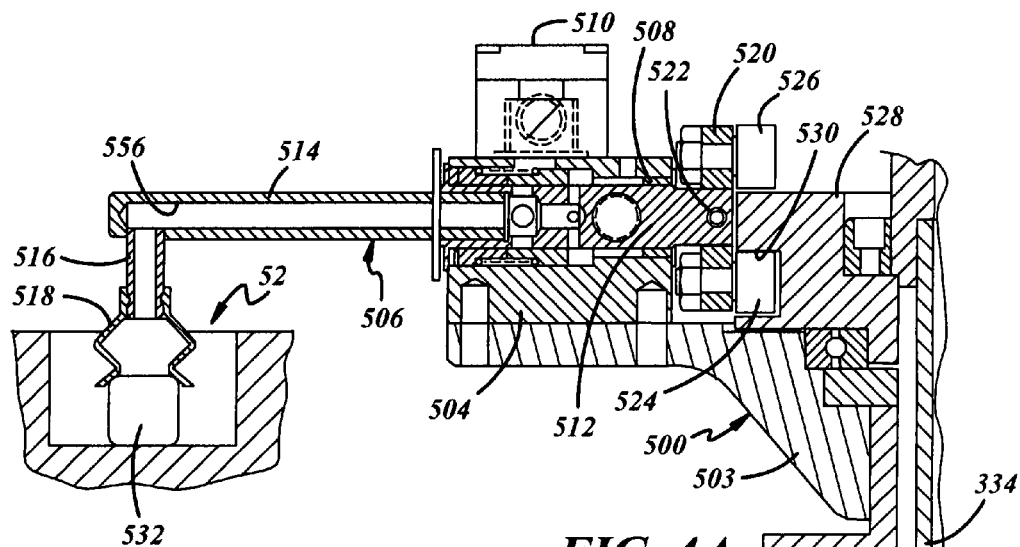
FIGS. 4A and 4B are fragmentary sectional views on an enlarged scale of portions of the mold charge placement apparatus in FIG. 3 at different stages of operation.
Figure 4B:
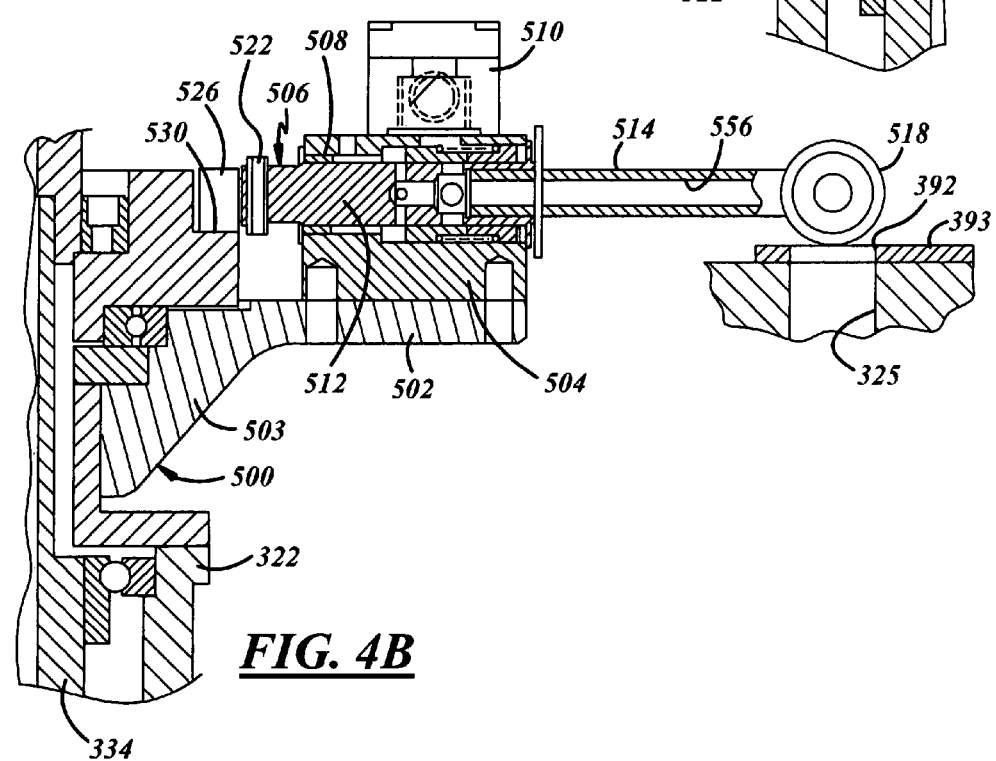

A carrier 500 (FIGS. 2-3, 4A and 4B) is coupled to sleeve 322 for corotation with the sleeve. Carrier 500 preferably includes a circular plate 502 carried by a hub 503. At least one block 504 is carried adjacent to the periphery of plate 502. In the illustrated embodiment, there are a pair of diametrically opposed blocks 504 as best seen in FIGS. 3, 4A and 4B. Each block 504 carries an arm 506 that is rotatably supported within block 504 by sleeve bearings 508. Each arm 506 thus is carried for rotation around a second axis at an angle to the first axis of rotation of carrier 500, preferably perpendicular to the axis of rotation of the carrier. A vacuum generator 510 preferably is carried by each block 504. Each arm 506 preferably includes an insert 512 rotatably carried by block 504 and a hollow tube 514 extending from one end of insert 512. A fitting 516 (FIGS. 3 and 4A) extends from the end of tube 514 spaced from block 504, and a mold charge pick-up cup 518 is secured to the end of fitting 516. The axis of fitting 516 and mold charge pick-up cup 518 preferably is perpendicular to the axis of tube 514 and arm 506. Mold charge pick-up cup 518 preferably is of annular bellows-shaped construction, although other pick-up cup geometries can be employed. Mold charge pick-up cup 518 preferably is of flexible resilient elastomeric construction such as silicone.

A lateral cross-piece 520 (FIGS. 3 and 4A) is secured to the radially inner end of each arm insert 512, such as by means of a roll pin 522. A pair of spaced rollers 524, 526 are mounted on lateral cross-piece 520. Rollers 524, 526 are spaced from each other on laterally opposed sides of the axis of rotation of arm 506. A cam 528 is mounted on shaft 344 in an angularly adjustable fixed position around the axis of rotation of sleeve 322 and carrier 500. Cam 528 has a peripheral cam track 530 on which rollers 524, 526 are disposed. Thus, as carrier 500 and arms 506 are rotated around the first axis of sleeve 322, cam 328 and follower rollers 324, 326 rotate arms 506 and mold charge pick-up cups 518 around the second axes of the arms, which preferably are coaxial.

Figure 5:
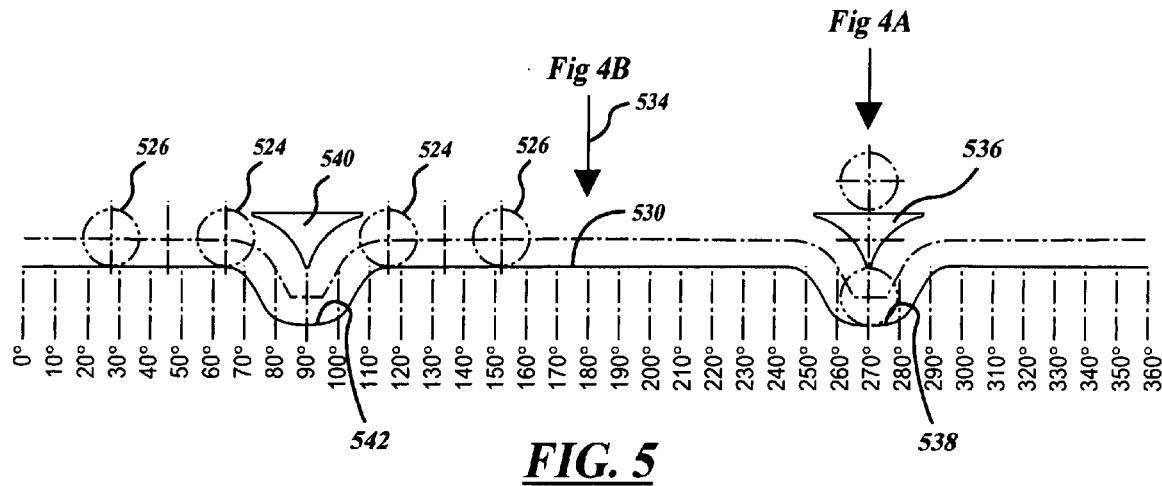
FIGS. 5 and 6 are schematic diagrams that illustrate operation of the cam and follower arrangement of FIGS. 3, 4A and 4B.
Figure 6:
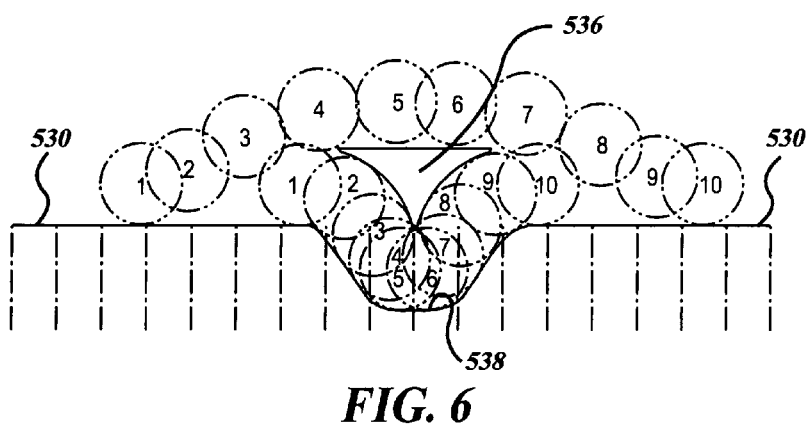

Assume that carrier 500 rotates clockwise in the orientation of FIG. 3, which is to say that mold charge pick-up cup 518 in FIG. 4B is rotating out of the page while mold charge pick-up cup 518 in FIG. 4A is rotating into the page. (One of the placement apparatus 130 in FIG. 1 rotates clockwise and the other apparatus rotates counterclockwise, as viewed from above.) Mold charge pick-up cup 518 preferably is oriented horizontally when passing over extruder nozzle 325 in FIGS. 3 and 4B to pick up a severed mold charge 532 (FIG. 4A) of molten plastic material. This occurs at approximately the position 534 in FIG. 5, which is a schematic diagram of cam operation. Continued travel to the right in FIG. 5 (clockwise in FIG. 3) brings follower rollers 524, 526 into engagement with an inverter section 536 of cam 528. As illustrated in FIG. 6, cam section 536 cooperates with a depression 538 in cam track 530 to invert follower rollers 524, 526. This inversion operation is illustrated schematically in FIG. 6. In other words, if cam follower roller 526 is leading cam follower roller 524 at pick-up position 534, inverter cam section 536 functions to invert the follower rollers so that follower roller 524 is leading follower roller 526 after passage through inverter cam section 536. At the mid-point of this inversion operation, pick-up cup 518 is oriented vertically downwardly, as illustrated in FIG. 4A to place mold charge 532 into the mold 52. Continued clockwise rotation of carrier 500 completes the mold charge pick-up cup inversion operation. The mold charge pick-up cup must then be re-inverted by the inverter section 540 and the depression 542 (FIG. 5) to orient the pick-up cup for receiving the next mold charge. Thus, severed mold charges are picked up, transported to molds 52 and deposited in molds 52 in sequence. Rotation of carrier 500 is synchronized with travel of the molds in their fixed path so that mold charges are deposited in sequence into the molds as the molds pass by the mold charge placement apparatus.

In summary, severed mold charges 532 (FIG. 4A) are picked up in sequence above nozzle 325, preferably with mold charge pick-up cups 518 oriented horizontally. The mold charges are transported to molds 52 and are deposited in the molds as the mold charge cups are inverted. This inversion operation facilitates placement of the mold charges into the molds in sequence, as distinguished from being dropped or thrown into the molds, as discussed in detail in the above-referenced patent documents. A second inversion process is required to reposition cup 518 to the forward position. In this preferred mode of operation, the mold charge pick-up cups will now be in the preferred horizontal pick-up orientation. Mold charge pick-up cups 518 and arms 514 are illustrated in FIGS. 3 and 4A at mid points of inversions, mold charge placement inversion to the left in FIG. 3 and in FIG. 4A, and reinversion to the right in FIG. 3. Other modes of operation are possible. For example, severed mold charges can be picked up with the mold charge pick-up cup opening vertically downwardly.

Figure 7:
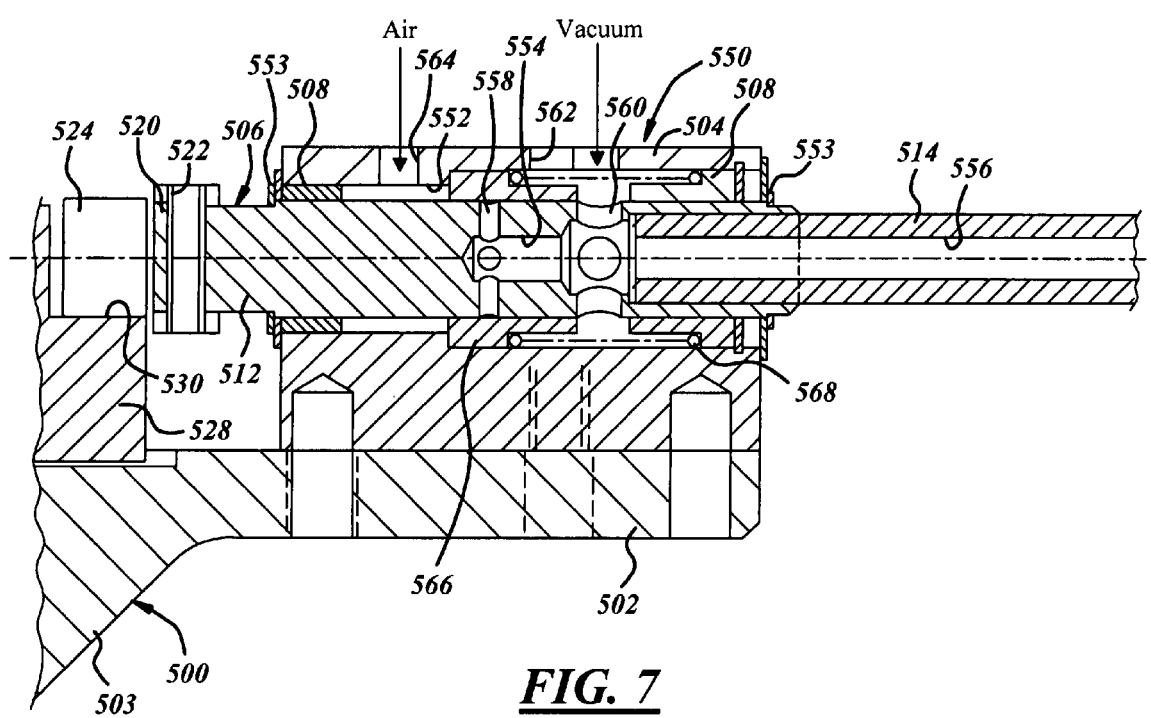
FIG. 7 is a fragmentary sectional view on an enlarged scale of a portion of the apparatus illustrated in FIG. 4B.

Referring now to FIG. 7, a control valve 550 on each block 504 controls application of air (under pressure) and vacuum to each arm 506 and its associated mold charge pick-up cup 518. Each valve 550 includes a valve body formed by block 504 and having a longitudinal passage 552 in which arm 506 is inserted. Arm insert 512 is free to rotate around the axis of the arm but is restrained by rings 553 against longitudinal movement within block 504. Arm insert 512 has an internal passage 554 that is aligned with the hollow interior passage 556 of tube 514. At least one passage 558, and preferably a plurality of angularly spaced passages 558, extends from passage 554 to the periphery of insert 512. At least one second passage 560, and preferably a plurality of angularly spaced passages 560, extends from passage 554 to the periphery of insert 512 at a position axially spaced from passages 558. Block 504 has a first opening 562 for connection to vacuum generator 510 (FIGS. 3, 4A and 4B) and a second opening 564 for connection to air control valve 550. A shuttle 566 surrounds arm insert 512 and is biased by a compressed coil spring 568 to a position between passages 564 and 562 overlying and blocking passage 558.

Figure 8:
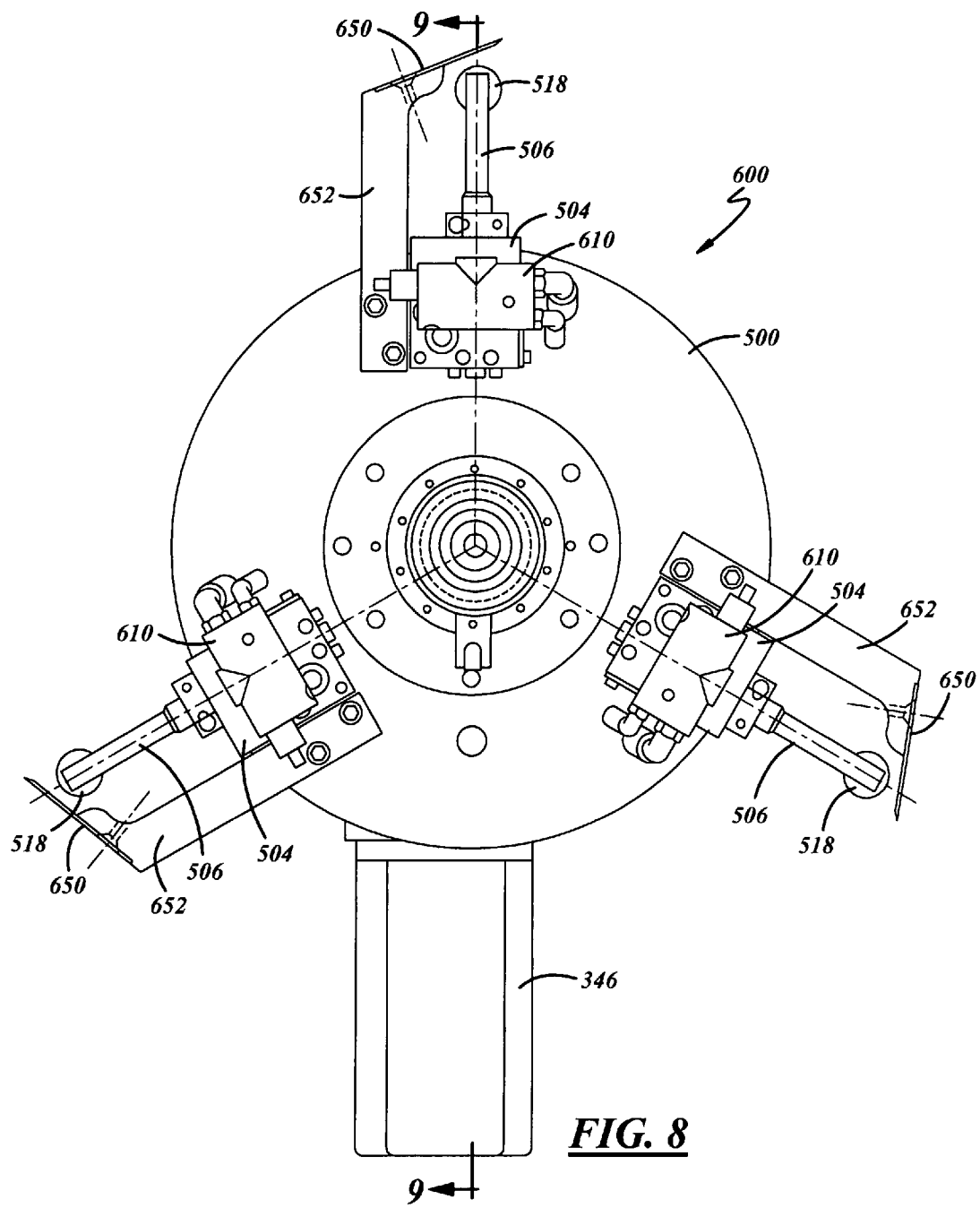
FIG. 8 is a top plan view of a mold charge placement apparatus in accordance with a second exemplary embodiment of the present disclosure.

When vacuum is applied to opening 562 and air under pressure is not applied to opening 564, shuttle 566 is in its spring-biased position to allow application of vacuum from opening 562 through openings 560 to passages 554, 556 and mold charge pick-up cup 518 (FIGS. 3, 4A and 4B). Such application of vacuum to the mold charge pick-up cup assists the cup to grasp and transport a mold charge severed by knife 393 (FIG. 4B). When pick-up cup 518 and mold charge 532 are in a position to deposit the mold charge into mold 52, as illustrated in FIG. 4A, air under pressure is applied to opening 564 in block 504 (FIG. 7). This air under pressure moves shuttle 566 to the right in FIG. 8 against the force of spring 568, blocking application of vacuum to tube passage 556 and applying air under pressure through openings 558 and passages 554, 556 to assist in depositing of the mold charge into the mold. Such application of air (or other gas) under pressure is terminated before the mold charge pick-up cup again reaches the pick-up position. Controlled application of air under pressure to opening 504 can be achieved by any suitable valving synchronized to rotation of carrier 500.

Figure 9:
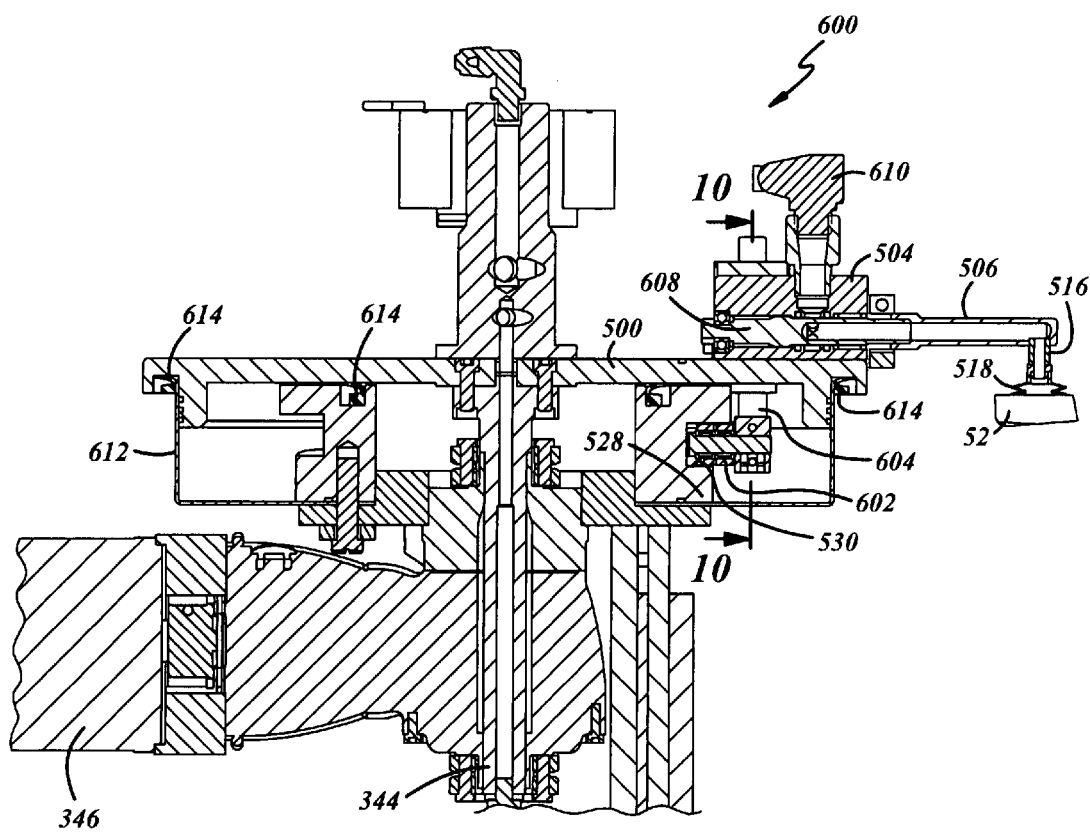
FIG. 9 is a fragmentary sectional view taken substantially along the line 9-9 in FIG. 8.
Figure 10:
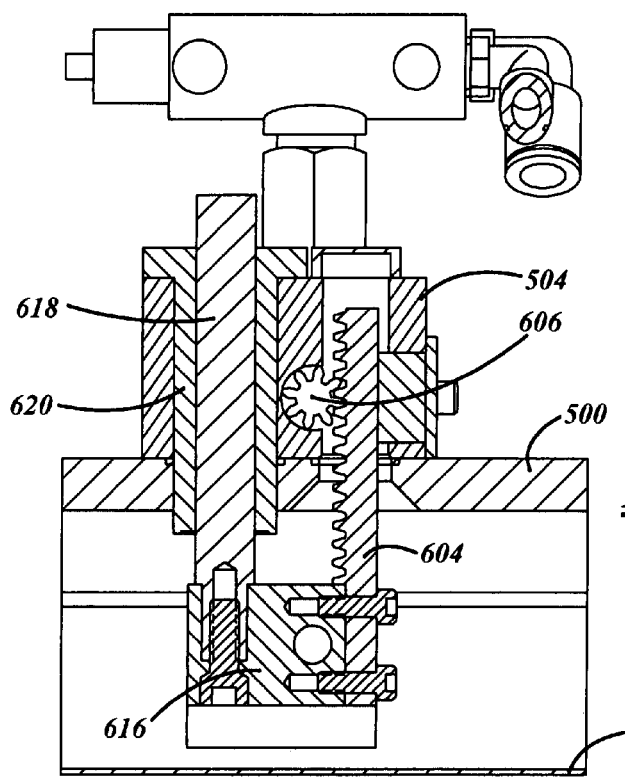
FIG. 10 is a fragmentary sectional view taken substantially along the line 10-10 in FIG. 9.

FIGS. 8-11 illustrate a mold charge placement apparatus 600 in accordance with a second exemplary embodiment of the present disclosure. Reference numerals in FIGS. 8-11 (and in FIG. 12) that are identical to numerals employed in FIGS. 1-7 indicate correspondingly related components. In mold charge placement apparatus 600, there are three arms 506 carried by corresponding blocks 504 at equal angular increments of 1200 around the periphery of carrier 500. Cam 528 (FIG. 9) is carried in (adjustable) fixed position beneath carrier 500, and a cam track 530 extends around the periphery of cam 528. A cam follower roller 602 is disposed in cam track 530 and coupled to a linear gear rack 604 (FIGS. 9 and 10). Gear rack 604 extends through carrier 500 into engagement with a pinion gear 606 (FIG. 10) that is coupled to arm 506, preferably by being formed integrally with an insert 608 (FIG. 9) to which arm 506 is secured. Thus, as carrier 500 15 rotates around the axis of shaft 344, cam follower rollers 602 move upwardly and downwardly in cam track 530 and rotate arm 506 and pick-up cup 518 around the axis of arm 506 as previously described. Arm 506 preferably is hollow, and receives vacuum and air pressure through a vacuum/air pressure controller 610. Cam 528 and follower rollers 602 preferably are disposed within an annular housing 612 that has flexible annular seals 614 to engage the undersurface of 20 carrier 500 as carrier 500 rotates. Follower rollers 602 (FIG. 9) preferably are mounted on a carrier 616 (FIG. 10) to which gear rack 604 is secured. A guide shaft 618 extends from carrier 616 through a sleeve bearing 620 on block 504 to guide movement of carrier 616 and gear rack 604.

Figure 11:
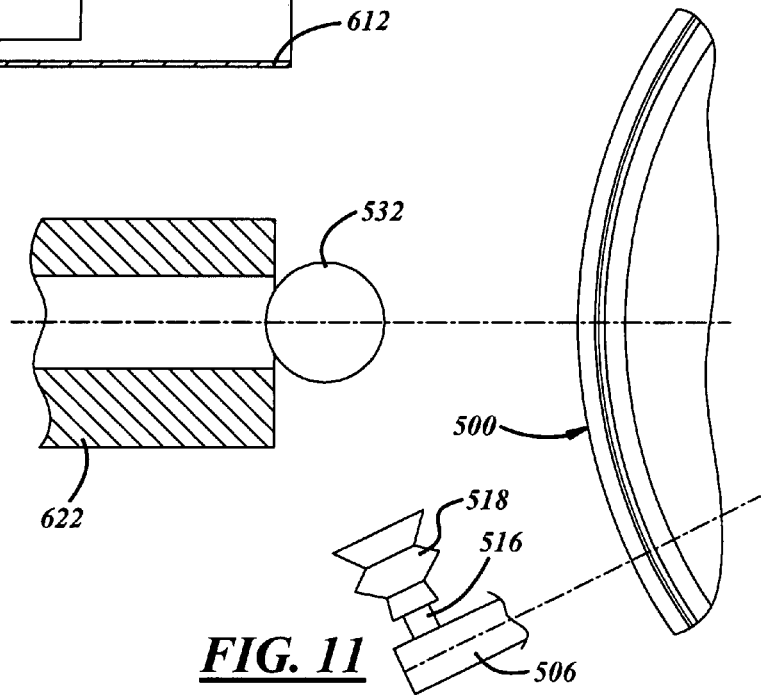
FIG. 11 is a fragmentary plan view that illustrates the embodiment of FIGS. 8-10 receiving a mold charge.

FIG. 11 illustrates a preferred feature of mold charge placement apparatus 600, in which the nozzle 622 from which a mold charge 532 is extruded opens horizontally rather than vertically in the embodiment of FIGS. 2-7. A knife 650 is carried by a knife holder 652 (FIG. 8) extending from carrier 500 adjacent to each arm 506 to sever a mold charge from nozzle 622 as the charge is grasped by cup 581. Horizontal opening of the extrudate nozzle has a number of advantages, including particularly that, on shut-down or start-up of the machine, the extrudate can be allowed to flow freely from the end of the nozzle, which can be problematic in the vertically upwardly nozzle opening orientation of FIG. 2.

Figure 12:
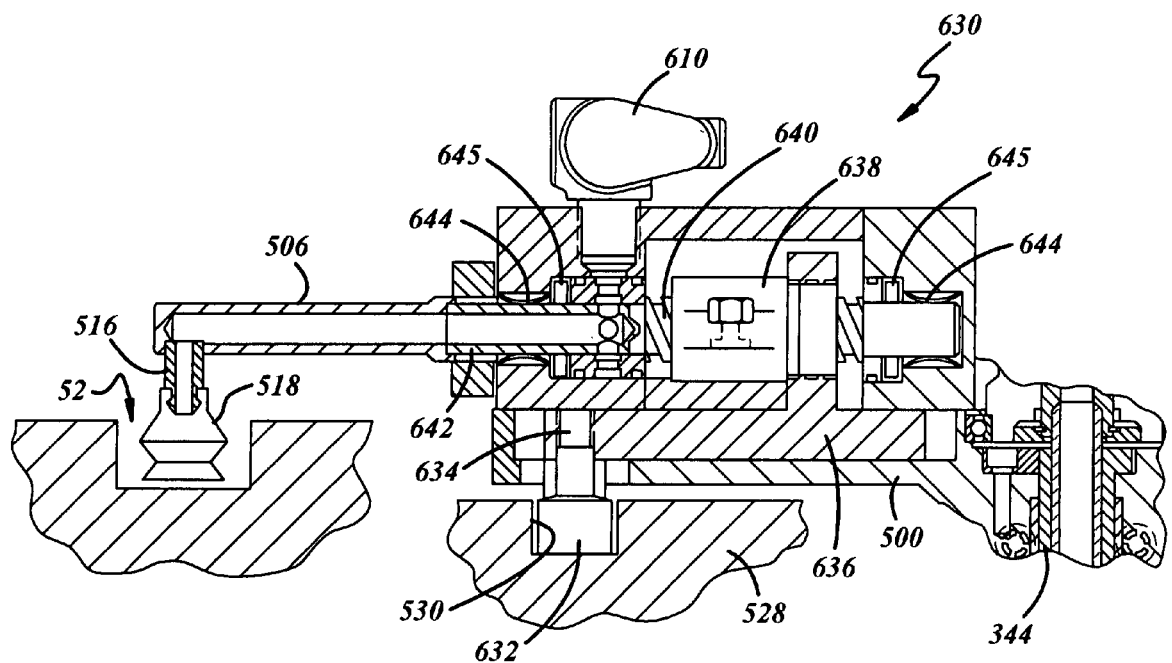
FIG. 12 is a fragmentary sectional view similar to that of FIG. 9 but illustrating a further exemplary embodiment of the present disclosure.

FIG. 12 illustrates a mold charge placement apparatus 630 in accordance with a third exemplary embodiment of the present disclosure. In this embodiment, cam 528 is again disposed beneath rotatable carrier 500, and this time has an upwardly opening cam track 530. A cam follower roller 632 is disposed in cam track 530 and coupled to a shaft 634 carried by a slide 636. A ball nut 638 is mounted on slide 636. Ball nut 638 encircles a ball nut shaft 640 that extends from and is operatively coupled to the end of insert 642 on which arm 506 is mounted. Needle bearings 644 engage insert 642 and the opposed end of shaft 640. Thrust bearings 645 absorb axial load on arm 506 due to ball nut 638. Insert 642 and ball nut shaft 640 can be formed as one piece. Thus, as cam track 530 moves follower rollers 632 inwardly and outwardly with respect to the axis of rotation of shaft 344, slide 636 correspondingly moves inwardly and outwardly (to the right and left in FIG. 12). Such movement of slide 636 and ball nut 638 functions through ball nut screw 640 to rotate arm 506 and pick-up cup 518 around the axis of arm 506 and shaft 640.

The disclosure has been presented in conjunction with exemplary embodiments, and a number of modifications and variations have been discussed. Other modifications and variations readily will suggest themselves to persons of ordinary skill in the art in view of the foregoing discussion. For example, although the disclosure has been presented in conjunction with a horizontal axis vertical wheel compression molding machine, it will be apparent that the mold charge placement apparatus of the present disclosure can be used equally as well in conjunction with a vertical axis carousel-type machine for placing mold charges into the molds of the machine. The disclosure is intended to embrace all such modifications and variations as fall within the spirit and broad scope of the appended claims.

The invention claimed is:

1. A compression molding machine that includes:
   a plurality of compression molds mounted to travel in a fixed path,
   a nozzle for supplying a stream of molten plastic, and
   an apparatus for picking up and transporting mold charges from said nozzle and placing the mold charges into said compression molds in sequence, said apparatus including:
   a carrier mounted for rotation around a first axis adjacent to said fixed path,
   at least one arm mounted on said carrier for rotation around a second axis at an angle to said first axis,
   a mold charge pick-up cup on said arm for receiving an individual mold charge from said nozzle, transporting the mold charge to a mold cavity and depositing the mold charge into the mold cavity,
   a cam mounted in stationary position adjacent to said carrier surrounding said first axis, and
   a cam follower operatively coupling said arm to said cam for rotating said arm around said second axis as said carrier is rotated around said first axis.

2. The machine set forth in claim 1 wherein said cam has a continuous cam track extending around said first axis, said cam track being contoured to rotate said arm and said mold charge pick-up cup around said second axis as a function of rotation of said carrier around said first axis.

3. The machine set forth in claim 2 wherein said cam follower includes at least one cam follower roller engaged with said cam track.

4. The machine set forth in claim 1 wherein said cam and said cam follower are such that said mold charge pick-up cup is oriented horizontally to receive a mold charge from said nozzle and oriented vertically to deposit the mold charge in a mold.

5. The machine set forth in claim 4 wherein said nozzle opens vertically upwardly to deliver a mold charge to said pick-up cup.

6. The machine set forth in claim 4 wherein said nozzle opens horizontally to deliver a mold charge to said pick-up cup.

7. The machine set forth in claim 1 wherein said cam follower is mounted on said arm.

8. The machine set forth in claim 1 wherein said cam follower is mounted on said carrier and operatively coupled to said arm.

9. The machine set forth in claim 8 wherein said cam follower is operatively coupled to said arm by a rack coupled to said cam follower and a pinion gear on said arm coupled to said rack.

10. The machine set forth in claim 8 wherein said cam follower is operatively coupled to said arm by a ball nut coupled to said cam follower and a ball screw on said arm and coupled to said ball nut.

11. The machine set forth in claim 1 wherein said arm has an internal passage for application of air and/or vacuum to said mold charge pick-up cup.

12. The machine set forth in claim 11 including a control valve on said carrier for selective application of air and vacuum through said passage to said mold charge pick-up cup.

13. The machine set forth in claim 12 wherein said control valve has a first input for connection to vacuum, a second input for connection to air under pressure, an output connected to said passage, a shuttle and a spring biasing said shuttle to feed vacuum to said passage, said shuttle being responsive to air under pressure at said second input to block application of vacuum to said passage and to feed air under pressure to said passage.

14. The machine set forth in claim 13 wherein said control valve is disposed within said arm.

15. The machine set forth in claim 1 including a plurality of said arms and said mold charge pick-up cups at angularly spaced positions around said carrier, each of said arms having a cam follower operatively coupled to said cam.

16. Apparatus for receiving mold charges and placing the mold charges into molds of a compression molding machine, which includes:
   a carrier mounted for rotation around a first axis,
   at least one arm mounted on said carrier for rotation around a second axis perpendicular to said first axis,
   a mold charge pick-up cup on an end of said arm for receiving a mold charge, transporting the mold charge around said first axis and depositing the mold charge into a mold,
   a passage in said arm for selective application of air and vacuum to said mold charge pick-up cup,
   a cam mounted in stationary position adjacent to said carrier surrounding said first axis, and
   a cam follower operatively coupling said arm to said cam for rotating said arm around said second axis as said carrier is rotated around said first axis.

17. The apparatus set forth in claim 16 wherein said cam has a continuous cam track extending around said first axis, said cam track being contoured to rotate said arm and said mold charge pick-up cup around said second axis as a function of rotation of said carrier around said first axis.

18. The apparatus set forth in claim 17 wherein said cam follower includes at least one cam follower roller engaged with said cam track.

19. The apparatus set forth in claim 18 wherein said cam and said follower are such that said mold charge pick-up cup is oriented horizontally to receive a mold charge from the nozzle and oriented vertically to deposit the mold charge into a mold.

20. The apparatus set forth in claim 18 wherein said cam follower is mounted on said arm.

21. The apparatus set forth in claim 18 wherein said cam follower is mounted on said carrier and operatively coupled to said arm.

22. The apparatus set forth in claim 21 wherein said cam follower is operatively coupled to said arm by a rack coupled to said cam follower and a gear on said arm coupled to said rack.

23. The apparatus set forth in claim 21 wherein said cam follower is operatively coupled to said arm by a ball nut coupled to said cam follower and a ball screw on said arm and coupled to said ball nut.

24. The apparatus set forth in claim 16 including a control valve on said carrier for selective application of air and vacuum through said passage to said mold charge pick-up cup.

25. The apparatus set forth in claim 24 wherein said control valve is disposed within said arm.

* * * * *